United States Patent
Moroni et al.

(10) Patent No.: US 12,448,070 B2
(45) Date of Patent: *Oct. 21, 2025

(54) TILTING VEHICLE WITH AT LEAST THREE WHEELS, A SAFETY DEVICE, AND A METHOD

(71) Applicant: QOODER S.A., Vacallo (CH)

(72) Inventors: Marco Moroni, Vacallo (CH); Michelangelo Liguori, Vacallo (CH)

(73) Assignee: QOODER S.A., Vacallo (CH)

( * ) Notice: Subject to any disclaimer, the term of this patent is extended or adjusted under 35 U.S.C. 154(b) by 480 days.

This patent is subject to a terminal disclaimer.

(21) Appl. No.: 17/908,992

(22) PCT Filed: Mar. 3, 2021

(86) PCT No.: PCT/IB2021/051766
§ 371 (c)(1),
(2) Date: Sep. 2, 2022

(87) PCT Pub. No.: WO2021/176368
PCT Pub. Date: Sep. 10, 2021

(65) Prior Publication Data
US 2023/0100207 A1  Mar. 30, 2023

(30) Foreign Application Priority Data

Mar. 6, 2020 (IT) .................. 102020000004780

(51) Int. Cl.
*B62H 1/10* (2006.01)
*B62J 17/086* (2020.01)
(Continued)

(52) U.S. Cl.
CPC .............. *B62H 1/10* (2013.01); *B62J 17/086* (2020.02); *B62K 5/027* (2013.01); *B62K 5/05* (2013.01); *B62K 5/08* (2013.01); *B62K 2005/001* (2013.01)

(58) Field of Classification Search
CPC . B62K 5/027; B62K 5/05; B62K 5/08; B62K 2005/001; B62K 2202/00; B62K 5/10; B62H 1/10; B62J 17/086
See application file for complete search history.

(56) References Cited

U.S. PATENT DOCUMENTS

| | | | |
|---|---|---|---|
| 7,815,238 B2 * | 10/2010 | Cao ..................... | B62J 17/08 296/193.07 |
| 8,480,111 B1 | 7/2013 | Kuo | |
| 2006/0063137 A1 * | 3/2006 | Robbins ............... | G05B 17/02 434/61 |

FOREIGN PATENT DOCUMENTS

| | | |
|---|---|---|
| WO | 2006049079 A1 | 5/2006 |
| WO | 2016001722 A1 | 1/2016 |
| WO | 2019123092 A1 | 6/2019 |

OTHER PUBLICATIONS

International Search Report and Written Opinion dated Mar. 25, 2021. 29 pages.

* cited by examiner

*Primary Examiner* — Jason D Shanske
*Assistant Examiner* — James J Triggs
(74) *Attorney, Agent, or Firm* — RMCK Law Group PLC

(57) ABSTRACT

A tilting vehicle includes a frame, a right wheel and a left wheel set alongside one another, a suspension system that operatively connects the right and left wheels to the frame, and an electronic control system operatively connected to the suspension system; the suspension system includes a first extensible assembly between the right wheel and the frame, and being designed to exert a thrust action between the right wheel and the frame to control tilting of the vehicle; the suspension system including a second extensible assembly between the left wheel and the frame, and being designed to exert a thrust action between the left wheel and the frame, (Continued)

to control tilting of the vehicle; the vehicle includes an actuation interface having an exposed surface operatively connected to the control system; the actuation interface is designed to be operated by a driver to control tilting of the vehicle upon command.

14 Claims, 8 Drawing Sheets

(51) Int. Cl.
    *B62K 5/027*     (2013.01)
    *B62K 5/05*     (2013.01)
    *B62K 5/08*     (2006.01)
    *B62K 5/00*     (2013.01)

TILTING VEHICLE WITH AT LEAST THREE WHEELS, A SAFETY DEVICE, AND A METHOD

CROSS-REFERENCE TO RELATED APPLICATION

This application is a 371 National Stage of International Application No. PCT/IB2021/051766, filed Mar. 3, 2021, which claims priority to Italian Patent Application No. 102020000004780 filed Mar. 6, 2020. The disclosure of each of the above applications is incorporated herein by reference in its entirety.

FIELD OF THE INVENTION

The present invention concerns the technical domain of tilting vehicles.

In particular, the present invention relates to a tilting vehicle and to a tilting method.

Moreover, the present invention relates to a safety device for a tilting vehicle.

PRIOR ART

Generally, tilting vehicles, for example motorcycles, are known that are adapted to tilt sideways, or roll, when they take a bend, where the gyroscopic effect generated by wheels of the vehicle as they turn tends to stabilize the vehicle position as the velocity of rotation of the wheels increases. At low speed of rotation of the wheels, and hence low travel speeds of the vehicle, the vehicle itself may prove to be particularly unstable, and the driver is usually forced to rest his feet on the ground to prevent the vehicle itself from falling over to one side, for example when the vehicle is standing still at traffic lights. Instead, at high travel speeds of the tilting vehicle, and hence high speeds of rotation of the wheels, the position of the vehicle becomes more stable. When going round a bend the driver must counter-steer, i.e., steer slightly in the direction opposite to that of the bend to bring about inclination of the vehicle in the direction of the bend (i.e., with the vehicle leaning into the bend) as a consequence of conservation of the gyroscopic angular moment.

Likewise known are tilting vehicles that comprise three or four wheels, where two front wheels are set alongside one another and steer to maintain the position of the vehicle more stable, such as is encountered in the products Piaggio® Mp3®, Peugeot® Metropolis®, Yamaha® Tricity®, Toyota® Iroad®, and Qooder® QV3®.

It is known to mount on vehicles of this sort so-called verticalization systems, which are able to manage automatically the elongation and/or stiffness of the hydropneumatic suspension through control of actuation of a pump that governs transfer of the working fluids. Systems of this sort, which can be applied to hydropneumatic suspensions, are illustrated and described in document No. EP-2046589 filed in the name of the present Applicant. Thanks to such verticalization systems, it becomes possible to stiffen automatically both of the suspensions of the wheels of the vehicle set alongside one another, keeping the position of the vehicle stable, for example when the vehicle is standing still at the traffic lights, thus avoiding the driver having to rest his feet on the ground.

In addition, thanks to the aforesaid verticalization systems, it becomes possible to control the position also in conditions of forward travel of the vehicle. For instance, document No. U.S. Pat. No. 7,802,800 discloses a system that, according to the speed at which the vehicle is cornering and the radius of the bend, is able to regulate the inclination of the vehicle using pumps or various devices that displace the fluids from one suspension to the other. In this case, driving the tilting vehicle resembles driving an automobile; i.e., as the handlebars are turned to the right the vehicle takes the bend, and leans, to the right, and as the handlebars are turned to the left the vehicle takes the bend, and leans, to the left. The driving style of an automobile type described above makes it possible to incline the vehicle towards the inside of the bend concomitantly with a concordant action of steering towards the inside of the bend itself. However, this does not exclude at all the risk of the vehicle falling over to one side (vehicle rollover). Indeed, in some situations, this risk of falling-over is even amplified as in the case where, while the driver is going round a bend, he decides to change the direction of steering such as in the case of an S bend, i.e., a sequence of bends to the right and to the left, as well as in that of facing a path of the slalom-between-pins or chicane type, as a result of the conservation of gyroscopic angular moment. Such situations of change of direction occur frequently on suburban roads but also in urban traffic, as well as on race tracks.

There is hence markedly felt the need to enable tilting vehicles with at least three wheels with narrow track to take a bend in motorcycle style, i.e., by counter-steering using the handlebars or the steering wheel while setting the angle of inclination.

In other words, there is felt the need to enable the driver of such vehicles with at least three wheels to take, for example, a right-hand bend by counter-steering, i.e., steering slightly, to the left.

In fact, the automatic systems for control of verticalization mentioned above enable steering of the vehicle in motorcycle style above a given speed threshold and enable steering of the vehicle in automobile style at low travel speeds, but they are not at all exempt from drawbacks: it will suffice to consider the objective difficulty perceived by the driver when he passes from one style to the other. For instance, when a vehicle equipped with such automatic verticalization systems crosses the speed threshold, the system automatically transmits command signals to the suspensions. As a result, the driver must promptly adapt steering of the vehicle to the style chosen by the system for that particular speed of advance.

The difficulty perceived by the driver is further aggravated in the case of sharp braking on a bend, which automatically imposes transition from a motorcycle style to an assisted driving style (i.e., an automobile style) as a result of crossing of the speed threshold. In this case, also road safety is jeopardized. The same difficulty is perceived also during acceleration.

There is hence markedly felt the need to render more reliable and safer riding of a tilting vehicle that has at least two wheels set alongside one another, without thereby reducing the stability of the position of the tilting vehicle at low travel speeds.

Solution

An object of the present invention is to overcome the drawbacks of the prior art mentioned above.

The above and other objects are achieved by a vehicle according to claim 1, as well as by a method according to claim 12.

Some advantageous embodiments form the subject of the dependent claims.

Thanks to the solutions proposed, the driver of the tilting vehicle provided with an improved control over the position of the vehicle, preventing the risk of bringing about reduced stability of the position of the vehicle.

Thanks to the solutions proposed, the driver of the tilting vehicle is provided with an improved control over the position of the vehicle and at the same time a satisfactory degree of safety in running conditions.

According to an aspect of the vehicles and methods of the invention, a tilting vehicle includes: a vehicle frame; at least three vehicle wheels comprising at least one right wheel and at least one left wheel set alongside one another; a suspension system, which operatively connects said right wheel and said left wheel to said vehicle frame; and an electronic control system.

According to an aspect of the vehicles and the methods of the invention, the suspension system comprises a first extensible assembly set between said right wheel and said vehicle frame, said first extensible assembly being designed to exert a thrust action between said right wheel and said vehicle frame to control tilting of the tilting vehicle; and a second extensible assembly set between said left wheel and said vehicle frame, said second extensible assembly being designed to exert a thrust action between said left wheel and said vehicle frame to control tilting of the tilting vehicle.

According to an aspect of the vehicles and the methods of the invention, the tilting vehicle comprises at least one actuation interface operatively connected to the electronic control system, wherein said at least one actuation interface is designed to be actuated in the case of need by a driver of the tilting vehicle in order to control tilting of the tilting vehicle upon command, i.e., in response to an action of command imparted by the driver of the tilting vehicle with at least three wheels.

According to an aspect of the vehicles and the methods of the invention, said actuation interface comprises a first portion, or right portion, set on the right side of the tilting vehicle, and a second portion, or left portion, set on the left side of the tilting vehicle. According to an aspect of the vehicles and methods of the invention, said actuation interface may be operated with the feet of the driver of the vehicle.

According to an aspect of the vehicles and the methods of the invention, the tilting vehicle further includes a cabin that defines a cockpit designed to receive the driver of the tilting vehicle, wherein said cockpit comprises at least one door that can be opened to allow the driver to gain access to the cockpit; and wherein said at least one actuation interface is located within said cockpit.

According to an aspect of the vehicles and the methods of the invention, the tilting vehicle comprises safety systems to enable opening of an emergency hatch of said door, bringing about formation of a gap in the bottom portion of the emergency hatch so as to allow the driver to rest at least one foot on the ground. For instance, one of said safety systems comprises at least one device for locking the at least one emergency hatch and a system for emergency opening of the at least one locking device that is mechanically operated and/or electrically operated.

DRAWINGS

Further characteristics and advantages of the vehicle and of the method according to the invention will emerge from the ensuing description of preferred examples of embodiment thereof, which are provided by way of non-limiting indication, with reference to the annexed drawings, wherein.

Figure 11:
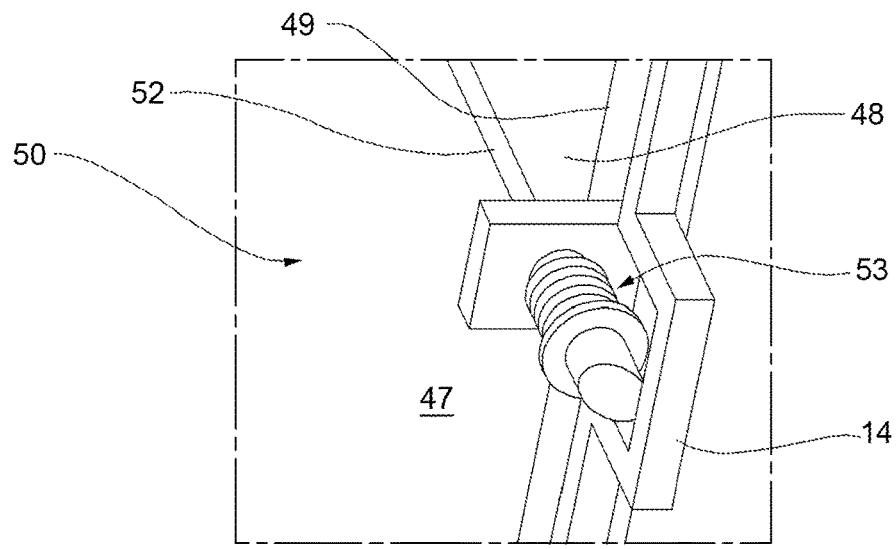
Figure 12:
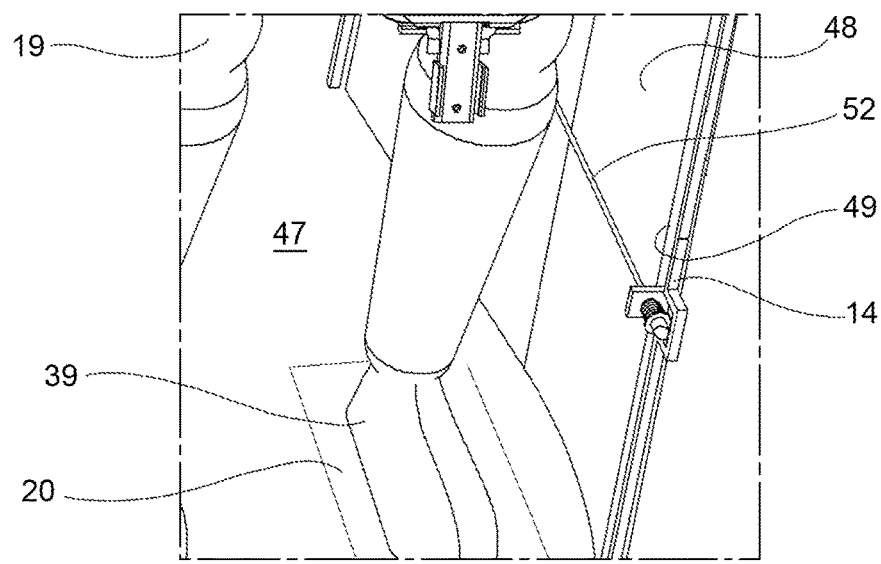
Figure 13:
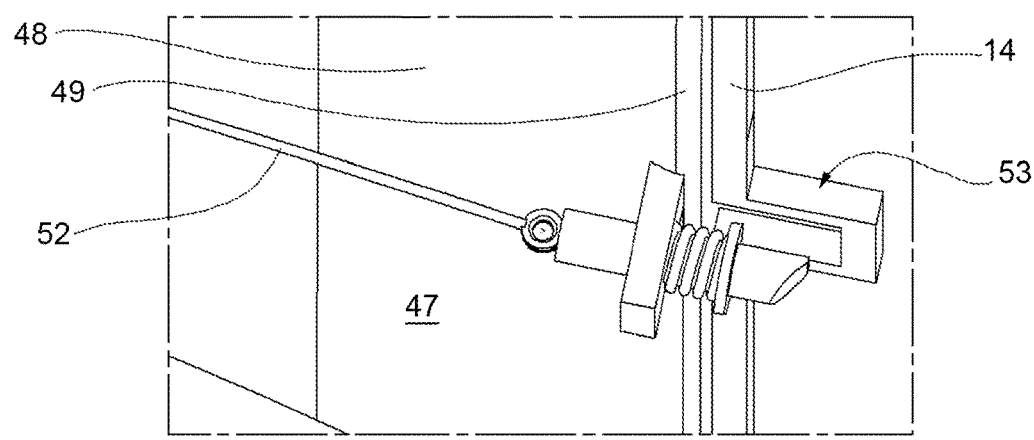
Figure 14:
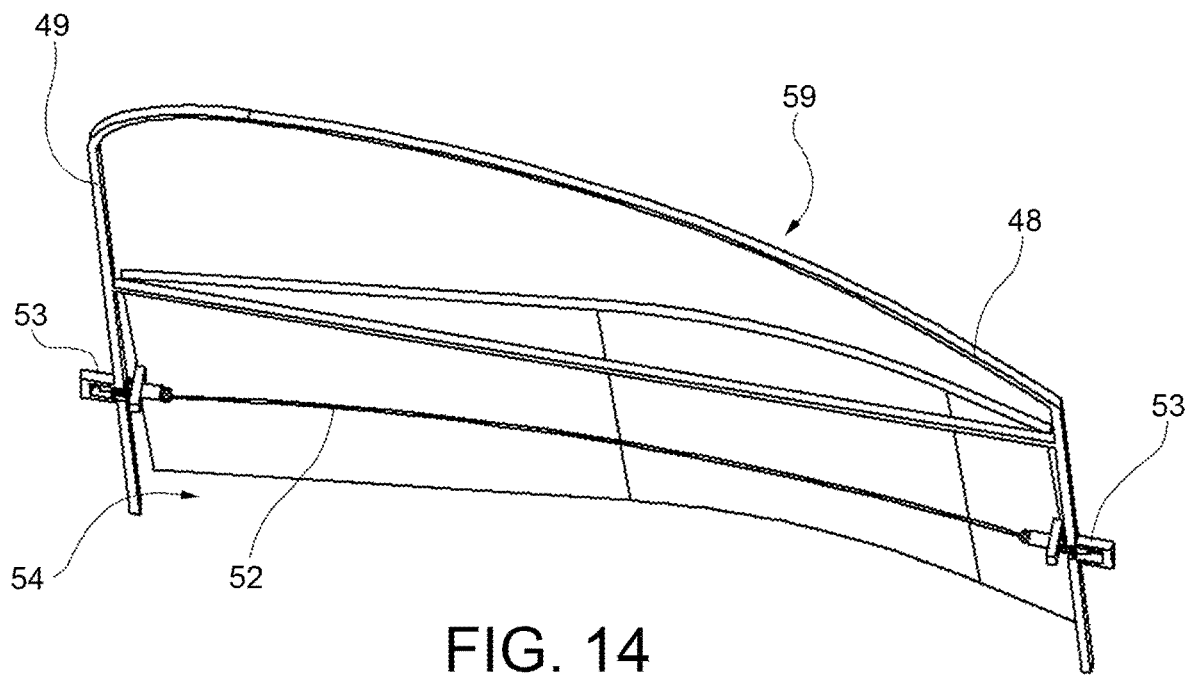
Figure 15:
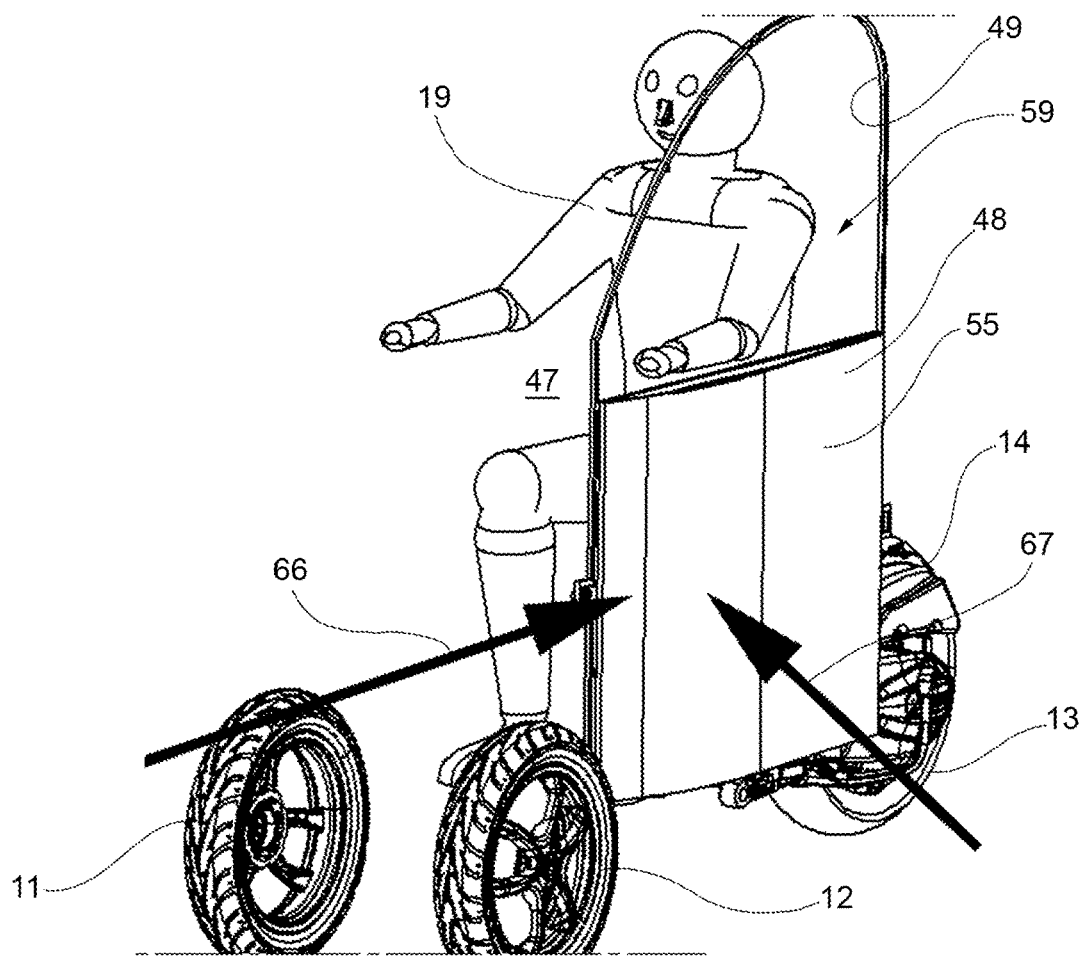
Figure 16:
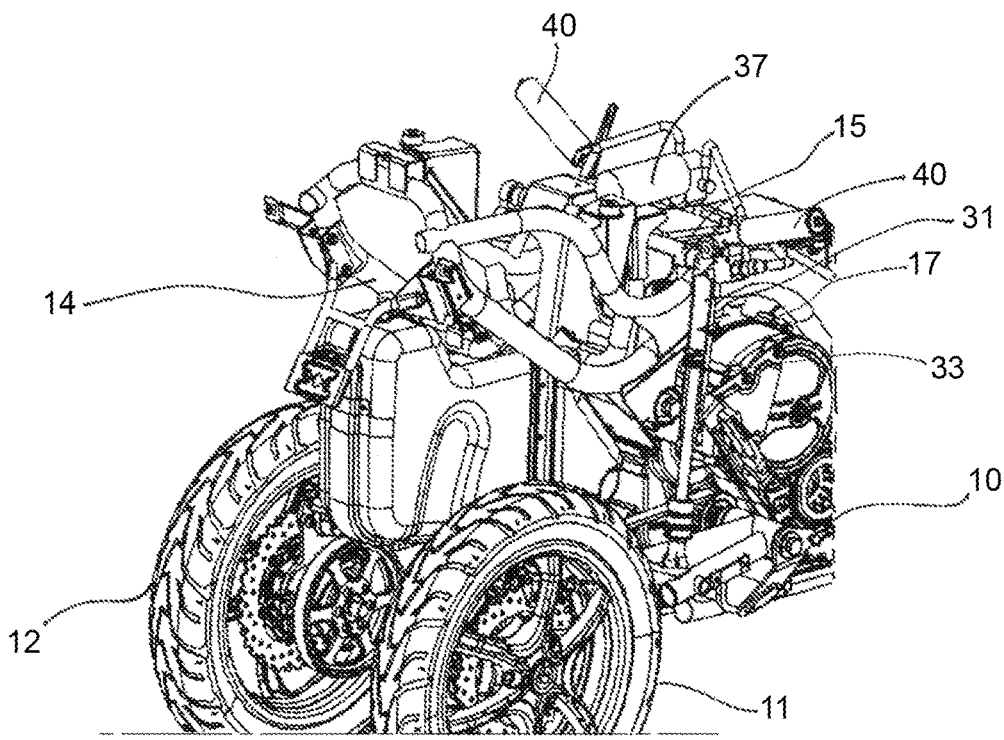
Figure 17:
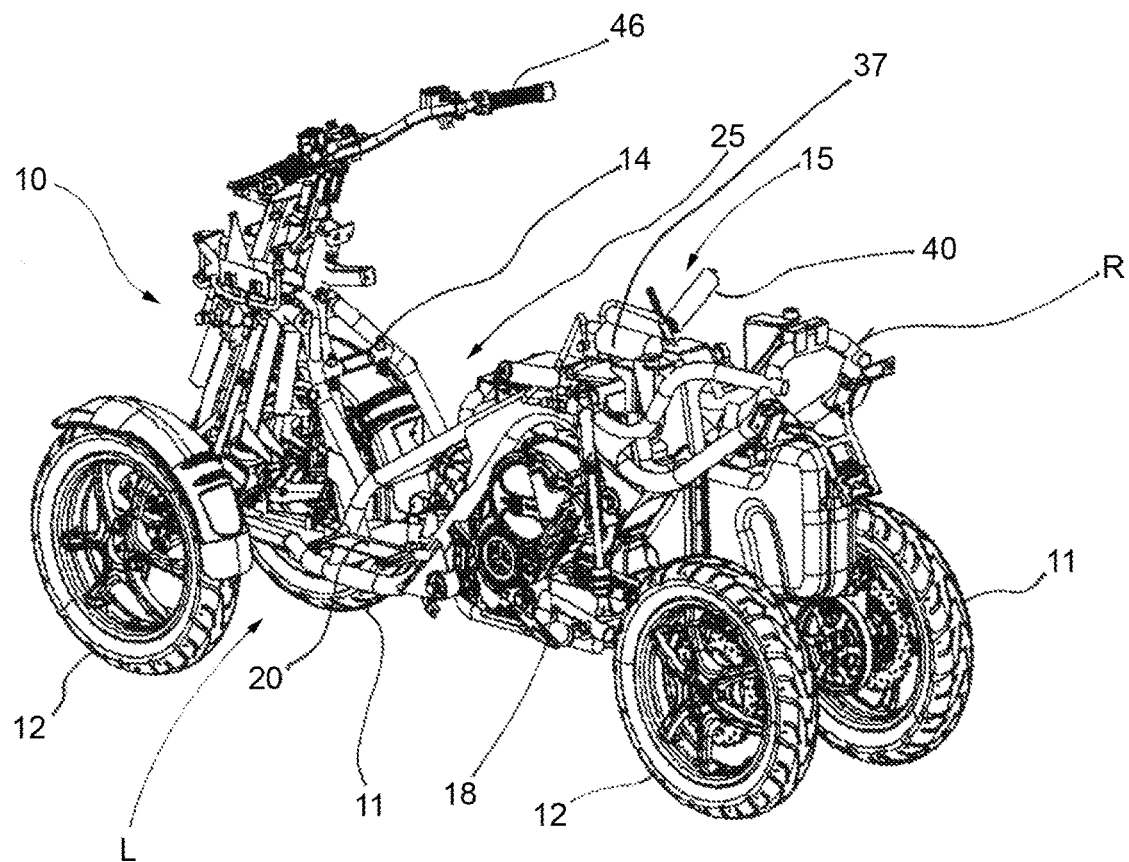

FIGS. 11, 12, and 13 show a safety system, according to one embodiment;

FIG. 14 is an axonometric view of a door of a tilting vehicle equipped with a safety system, according to one embodiment;

FIG. 15 is an axonometric view of a door of a tilting vehicle equipped with a safety system, according to one embodiment;

FIG. 16 shows, with parts represented partially in see-through view for reasons of clarity, a portion of a tilting vehicle having at least two rear wheels set alongside one another, according to one embodiment; and FIG. 17 shows, with parts represented partially in see-through view for reasons of clarity, a four-wheeled tilting vehicle, according to one embodiment.

DETAILED DESCRIPTION OF SOME EMBODIMENTS

According to a general embodiment, a tilting vehicle 10 is provided.

By the term "tilting vehicle" is meant an oscillating vehicle designed to tilt sideways with respect to the surface of advance 29, i.e., to perform a movement of roll in order to take a bend, such as a two-wheeled or three-wheeled motorcycle, a tilting quadricycle, and the like. For instance, said tilting vehicle 10 is a motorcycle such as a scooter that can be powered by at least one internal-combustion engine and/or at least one electric and/or magnetic-propulsion motor. The vehicle 10 may even be human-powered, like a bicycle. For instance, said tilting vehicle 10 comprises a steering controller 46, for example a handlebar 46 or else a steering wheel that can be controlled by a driver 19 of the vehicle.

The tilting vehicle 10 comprises at least three vehicle wheels, or wheels. Said at least three vehicle wheels are designed to perform a movement at least of rolling on a surface of travel 29 for the vehicle 10 at least when the tilting vehicle 10 proceeds in conditions of forward travel.

Said tilting vehicle 10 comprises a vehicle frame 14. The frame 14 is preferentially a tilting frame designed to tilt, or roll, when the tilting vehicle takes a bend, thus defining the position of the tilting vehicle 10. By the term "position" is meant the lateral-roll position, or the tilting position, of the tilting vehicle.

Said at least three vehicle wheels comprise at least one right wheel 11 and at least one left wheel 12 set alongside one another. Preferentially, the at least one right wheel 11 is set on the right side R of the tilting vehicle 10 with respect to the driver 19, and the at least one left wheel 12 is set on the left side L of the tilting vehicle 10 with respect to the driver 19.

Figure 1:
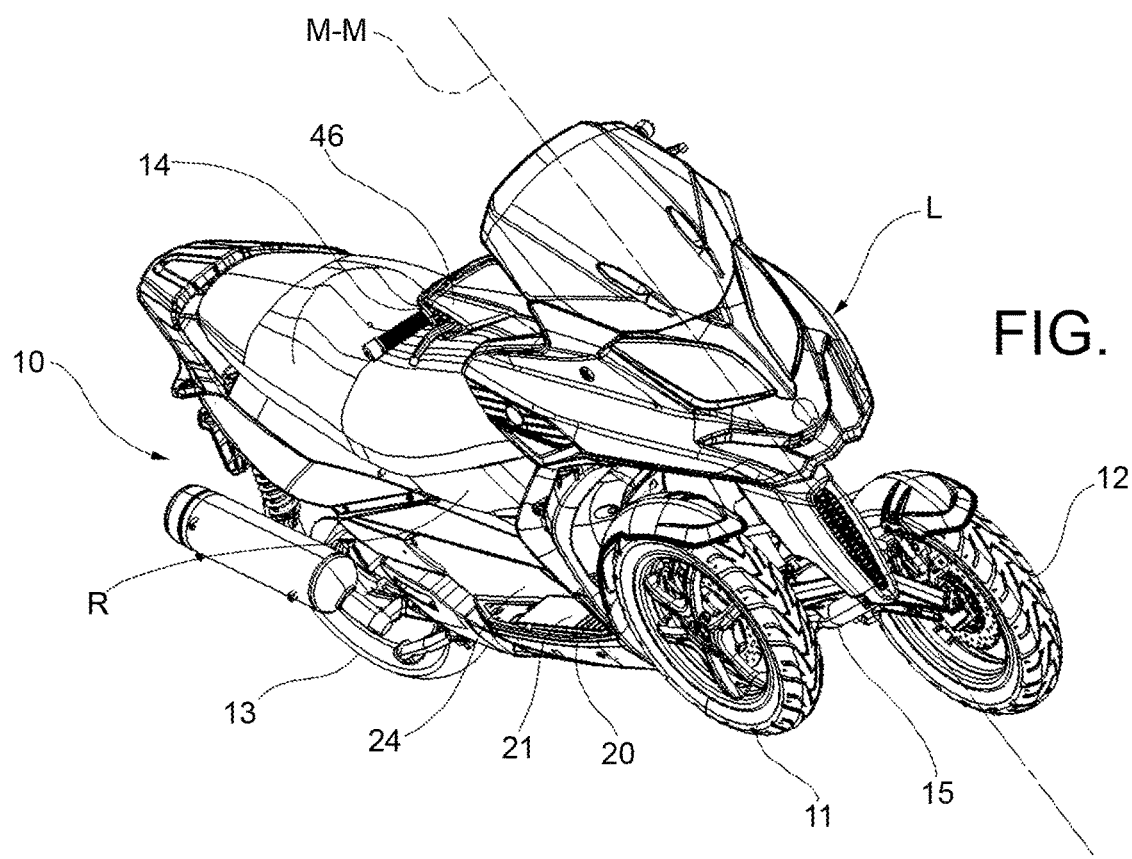
FIG. 1 is an axonometric front view of a tilting vehicle, according to one embodiment.
Figure 2:
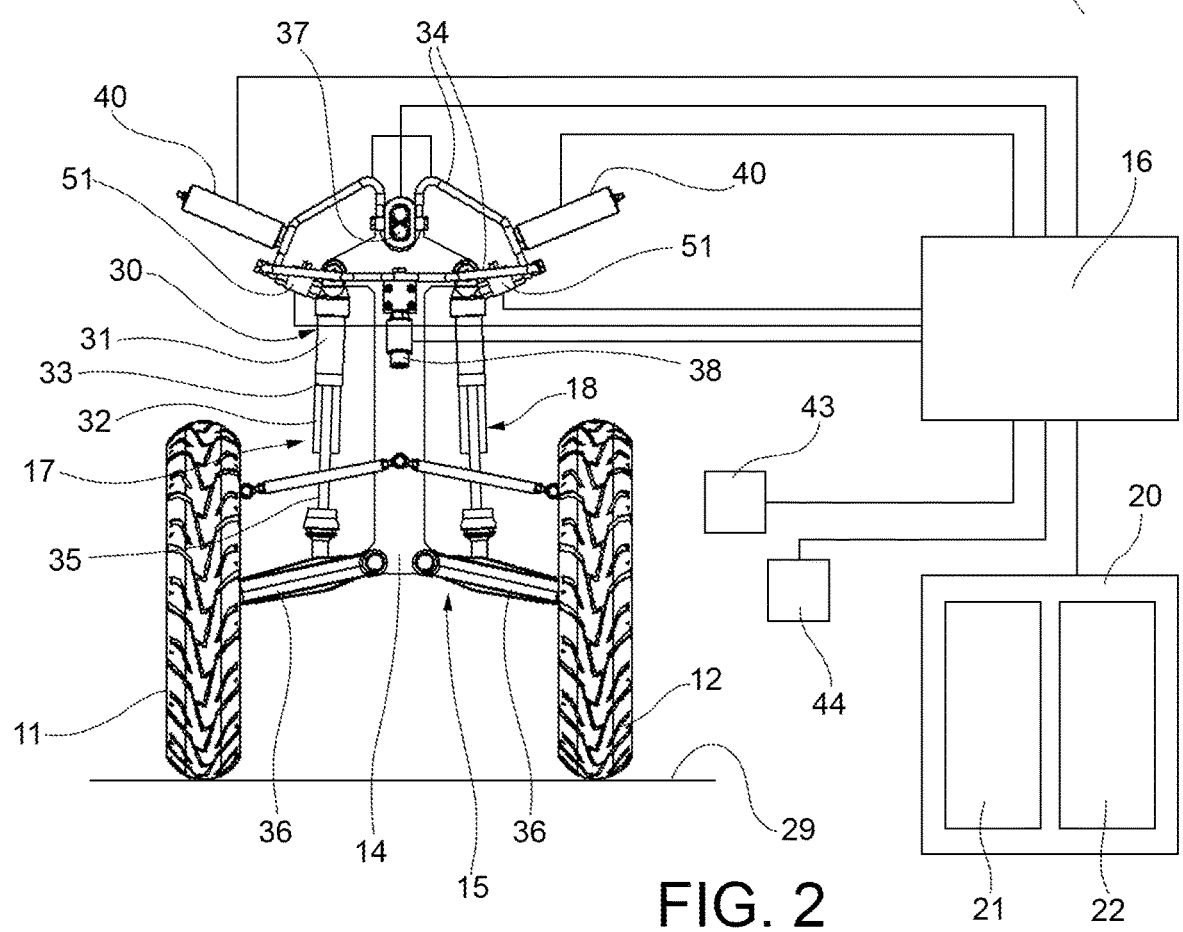
FIG. 2 shows in vertical elevation a suspension system of a tilting vehicle and represents schematically a control system and an actuation interface associated to said suspension system.
Figure 3:
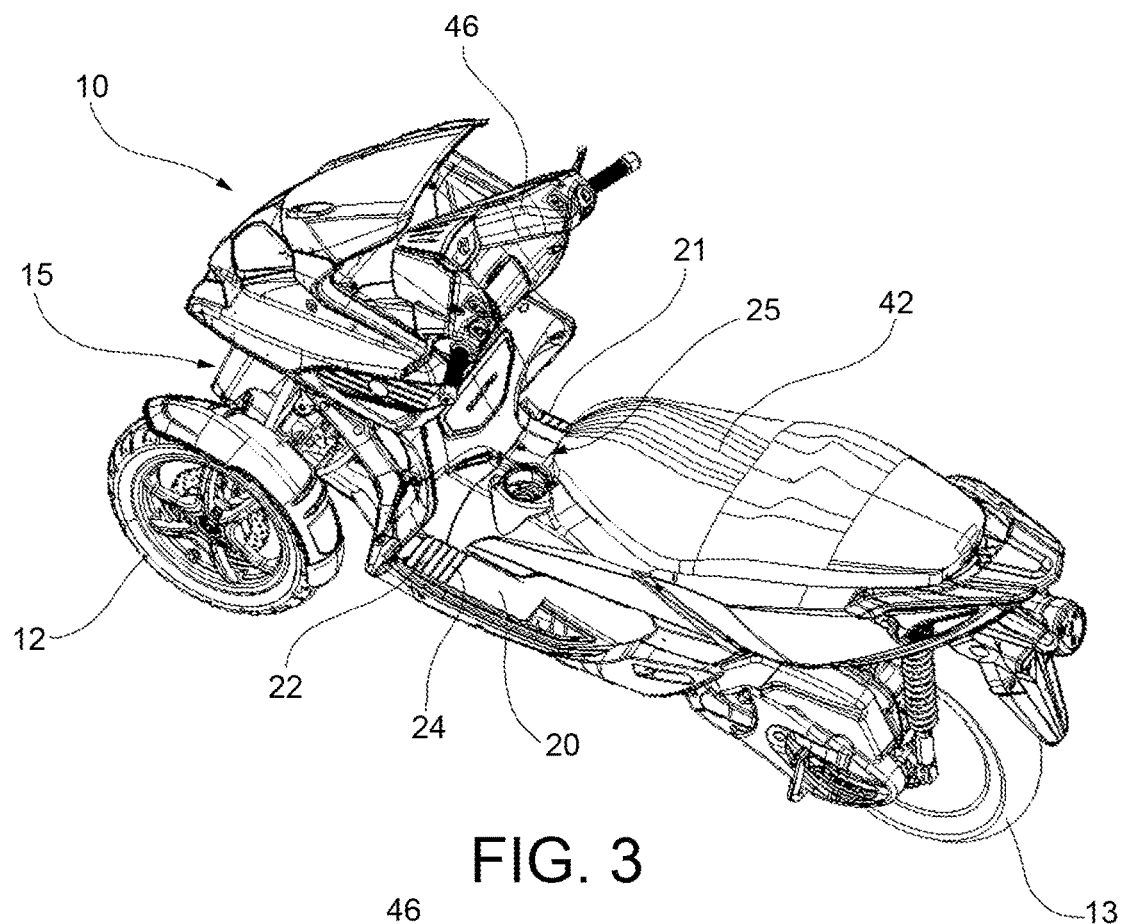
FIG. 3 is an axonometric view from above of a tilting vehicle, according to one embodiment.
Figure 4:
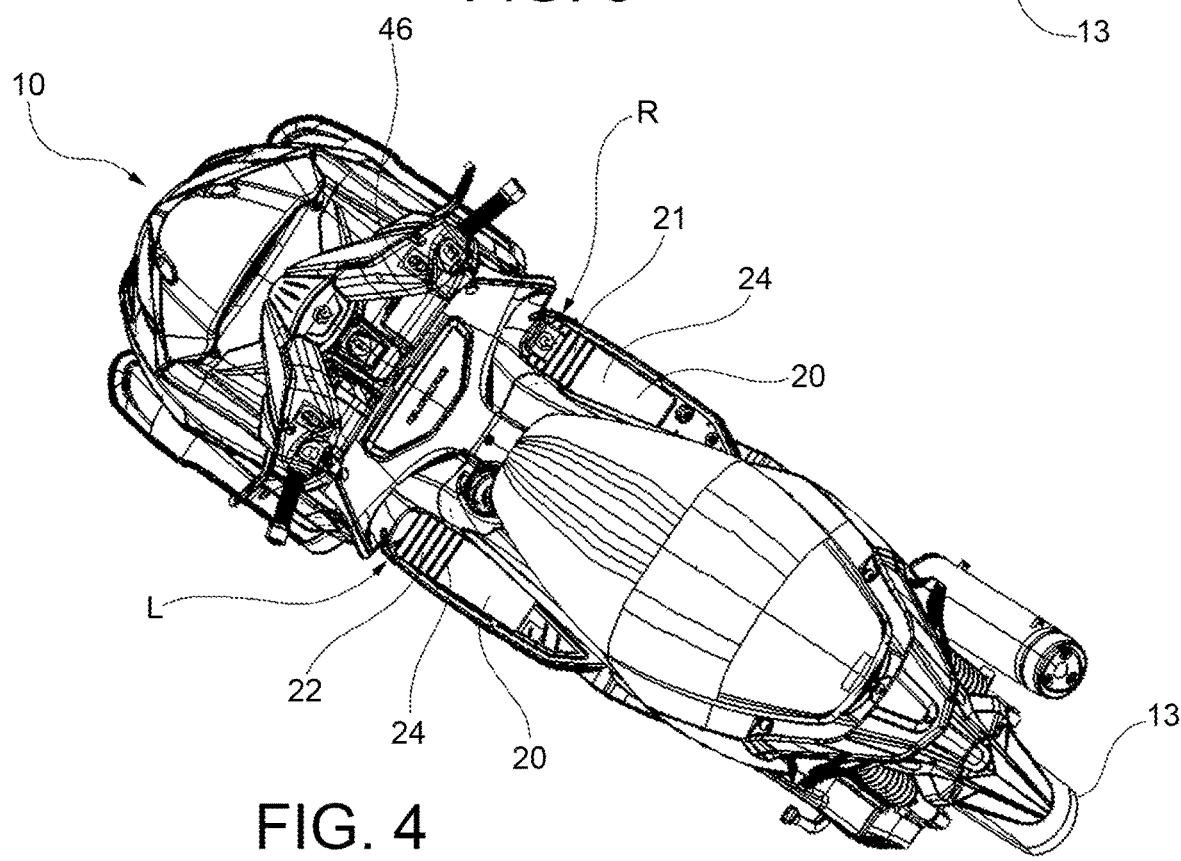
FIG. 4 is a top plan view of a tilting vehicle, according to one embodiment.
Figure 5:
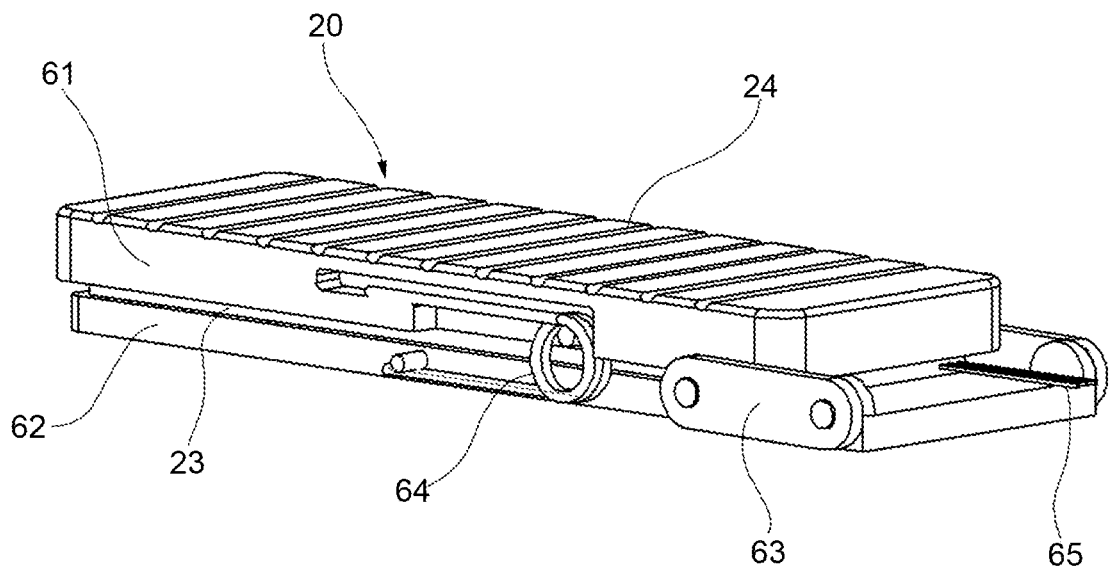
FIG. 5 shows an actuation interface in axonometric view, according to one embodiment.

The tilting vehicle 10 may further comprise at least one further wheel 13 not set alongside said at least one right wheel 11 and said at least one left wheel 12, as illustrated, for example, in FIG. 1, where the further wheel 13 not set alongside the other wheels is a rear wheel of the vehicle.

Preferentially, the right wheel 11 and the left wheel 12 are steering wheels of the vehicle connected to a steering controller 46, for example handlebars 46 or else a steering wheel.

The tilting vehicle 10 may comprise at least four vehicle wheels, as illustrated, for example, in FIG. 17, set alongside one another in pairs.

The tilting vehicle 10 may comprise at least four vehicle wheels, where two wheels are aligned with one another, and the other two wheels 11, 12 are set alongside one another.

Said tilting vehicle 10 further comprises a suspension system 15, which operatively connects said right wheel 11 and said left wheel 12 to said vehicle frame 14.

Said suspension system 15 comprises at least one first extensible assembly 17, or right extensible assembly 17, between said right wheel 11 and said vehicle frame 14, and at least one second extensible assembly 18, or left extensible assembly 18, between said left wheel 12 and said vehicle frame 14. For instance, said extensible assemblies 17, 18 can be extended or shortened telescopically.

According to one embodiment, said right wheel 11 and said left wheel 12 are two rear-axle wheels of a tilting vehicle 10, i.e., two rear wheels, and said suspension system 15 is a rear suspension system of the vehicle, as illustrated, for example, in FIG. 16. At least one further wheel 13 may be provided not set alongside nor associated to the forecarriage of the tilting vehicle 10, or else the forecarriage may be associated to two wheels set alongside one another.

According to one embodiment, said right wheel 11 and said left wheel 12 are two front-axle wheels of a tilting vehicle 10, i.e., two front wheels, and said suspension system 15 is a front suspension system of the vehicle.

According to one embodiment, the tilting vehicle 10 comprises at least four vehicle wheels, said at least four wheels comprising two pairs of wheels set alongside one another, each pair of wheels including a right wheel 11 and a left wheel 12 and a suspension system 15, as described previously with reference to any one of the embodiments described above.

According to a preferred embodiment, each one between said first extensible assembly 17 and said second extensible assembly 18 of the suspension system 15 comprises a hydro-pneumatic shock absorber, which includes a cylinder 30, which slidably receives a piston 33, thus forming a first chamber 31 containing working fluid, for example oil.

According to one embodiment, the piston 33 forms in each extensible assembly 17, 18 a second chamber 32 containing gas under pressure, where said first chamber 31 and said second chamber 32 of each extensible assembly 17, 18 are sealingly separated from one another by the respective piston 33.

According to a preferred embodiment, the first chamber 31 of the first extensible assembly 17 is in fluid communication with the first chamber 31 of the second extensible assembly 18 by means of at least one duct 34. In this way, the working fluid can flow between said first chamber 31 of the first extensible assembly 17 and said first chamber 31 of the second extensible assembly 18. According to a preferred embodiment, the suspension system 15 further comprises at least one pump 37, designed to move the working fluid between said first chamber 31 of the first extensible assembly 17 and said first chamber 31 of the second extensible assembly 18. Preferentially, the pump 37 is a hydraulic pump mounted on the duct 34.

According to a preferred embodiment, each piston 33 is associated to a stem 35, which is in turn connected, for example articulated, to an arm 36, rotatably mounted on which is a vehicle wheel 11, 12 of said two wheels set alongside one another. According to a preferred embodiment, the suspension system 15 further comprises at least one tank 40 connected to the duct 34.

To control tilting, the pump 37 moves the working fluid between said first chambers 31, co-operating with the proportional solenoid valve 38. According to one embodiment, on-off valves 51 are provided to enable, by closing said valves 51, blocking of the suspension and hence the possibility of stopping the vehicle for a prolonged period of time.

According to one embodiment, each one between said first extensible assembly 17 and said second extensible assembly 18 of the suspension system 15 is an electronic system.

The tilting vehicle 10 further comprises an electronic control system 16 operatively connected to said suspension system 15, which preferentially includes at least one data-processing unit. The provision of said electronic control system 16 operatively connected to the suspension system 15 enables control of the first extensible assembly 17 and of the second extensible assembly 18.

The first extensible assembly 17 of the suspension system 15 is designed to exert a thrust action between said right wheel 11 and said vehicle frame 14 to control tilting of the tilting vehicle 10. Thanks to said thrust action between said right wheel 11 and said vehicle frame 14 it is possible to bring about a lengthening of the first extensible assembly 17 that controls the position of the tilting vehicle 10, for example urging the frame of the vehicle 14 to lean to the left.

The second extensible assembly 18 of the suspension system is designed to exert a thrust action a thrust action between said left wheel 12 and said vehicle frame 14 in order to control tilting of the tilting vehicle 10. Thanks to said thrust action between said left wheel 12 and said vehicle frame 14 it is possible to bring about a lengthening of the second extensible assembly 18 that controls the position of the tilting vehicle 10, for example urging the frame of the vehicle 14 to lean to the right.

During lengthening of one of said extensible assemblies 17 or 18 it is possible to witness a simultaneous shortening of the other of said extensible assemblies 18 or 17.

According to one embodiment, said electronic control system 16 is configured to bring about in an independent way the respective thrust action so as to cause possible lengthening and/or shortening of each one between said first extensible assembly 17 and said second extensible assembly 18 of the suspension system 15 in order to control tilting of the tilting vehicle 10.

The wording "in an independent way" used above is not intended to exclude the possibility of the extensible assemblies 17, 18 of the suspension system 15 being shortened simultaneously and/or lengthened simultaneously and/or one being shortened and the other being extended.

Advantageously, the tilting vehicle 10 comprises at least one actuation interface 20 operatively connected to the electronic control system 16 and designed to be operated in the case of need by a driver 19 of the tilting vehicle 10 in order to control tilting of the tilting vehicle 10 upon command.

Thanks to a tilting vehicle 10 of this sort, the driver 19 of the tilting vehicle 10 can control tilting of the vehicle 10 in an intuitive way, imparting an action of command on said at least one actuation interface 20.

Provision of the at least one actuation interface 20 operatively connected to the electronic control system 16 enables the driver 19 of the tilting vehicle 10 to effect actuation of the extensible assemblies 17, 18 of the suspension system 15.

As further advantage, said at least one actuation interface 20 comprises an exposed surface 24 operatively facing at least one part of the body of the driver 19 when in use so that the driver 19 can impart the action of command on said exposed surface 24. Preferentially, the term "exposed surface 24" is meant to indicate a free surface designed to be touched, for example pressed, by the substantially direct application of force by the driver 19, and is not meant to indicate a surface internal to the members of transmission of the steering command.

In the case where said two portions 21, 22 of the actuation interface 20 are provided, each one and both of said portions 21, 22 may have an exposed surface 24. In the case where the exposed surface is set on a manually controlled lever, the exposed surface 24 may even face only the inside of the fingers of a hand of the driver while he is driving the vehicle such as when the driver gets hold of a handlebar grip.

Provision of said exposed surface 24 makes it simple for the driver 19 to impart the action of command on the actuation interface 20 aimed at controlling tilting of the tilting vehicle 10.

According to a preferred embodiment, said at least one actuation interface 20 comprises at least a first portion 21 and a second portion 22 arranged on opposite sides with respect to a median axis M-M of the tilting vehicle. For instance, the first portion 21 of the actuation interface 20 is set on the right side R of the tilting vehicle 10 with respect to the driver 19, and the second portion 22 is set on the left side L of the tilting vehicle 10 with respect to the driver 19.

According to a preferred embodiment, an action of command imparted on the first portion 21 of the actuation interface 20 set on the right side R causes an increase in tilting of the tilting vehicle 10 towards the left side L, and an action of command on the second portion 22 of the actuation interface 20 set on the left side L causes an increase in tilting of the tilting vehicle 10 towards the right side R. For instance, an action of command imparted on the first portion 21 of the actuation interface 20 set on the right side R causes a thrust and possible lengthening of the extensible assembly 17, thereby exerting a thrust on the wheel 11 set on the right side R, and likewise, an action of command on the second portion 22 of the actuation interface 20 set on the left side L causes a thrust and possible lengthening of the extensible assembly 18, thereby exerting a thrust on the wheel 12 set on the left side L.

The actuation portions or interfaces 21, 22 may both be operated simultaneously. In this case, the resulting direction of tilting of the position of the vehicle may, for example, depend upon the differential of the amount of pressure applied on each interface 21, 22, or else, in the case of simultaneous operation, the position of the vehicle will remain constant, and preferably the position of the vehicle will be controlled into a substantially horizontal configuration.

Thanks to a tilting vehicle 10 of this sort, the driver 19 is put in the condition of being able to exert, by pressing the first portion 21 and/or the second portion 22 of the actuation interface 20, a corresponding thrust on the wheels 11 and 12 in an intuitive way.

Preferentially, the interface 21 set on the right side R of the tilting vehicle 10, when operated, exerts a thrust on the right wheel 11, and the interface 22 on the left side L of the tilting vehicle 10, when operated, exerts a thrust on the left wheel 12.

When in use, the driver 19 imparts an action of command on said at least one actuation interface 20 in order to control tilting of the tilting vehicle 10 upon command, and preferentially, the action of command imparted by the driver 19 results in activation of the pump 37, which transfers a part of the working fluid between said two first chambers 31 of the first and second extensible assemblies 17, 18 of the suspension system 15. In this way, a controlled exertion of the respective actions of thrust is obtained upon command, which can bring about lengthening and/or shortening of the extensible assemblies 17, 18 of the suspension system 15. For instance, the solenoid valve 38 works in combination with the oil pump 37, rendering more or less energetic the action of the pump 37 itself: hence, with total closing of the valve 38, there is maximum action of the oil pump; vice versa, with maximum opening of the valve 38, there is minimum action of the oil pump, and consequently with the valve 38 totally open the moderate thrust exerted by the pump might not lead to lengthening of the extensible assemblies.

According to one embodiment, the electronic control system 16 is associated to a detection system designed to detect information on at least one state variable of the tilting vehicle 10, such as the travel speed of the tilting vehicle 10, and/or the angle of inclination of roll of the tilting vehicle, 10 and/or the pressure in the tank 40 of the suspension system 15 of the tilting vehicle 10. Preferably, by the term "angle of inclination of roll" is meant the angle of tilting of the tilting vehicle, for example evaluated as the inclination, with respect to a vertical and/or horizontal axis, of the median axis M-M of the tilting vehicle. Preferentially, the detection system makes a real-time detection of the at least one state variable of the tilting vehicle 10 and co-operates with the electronic control system 16 in real time. According to one embodiment, the electronic control system 16 further comprises a memory that stores a plurality of data regarding the position of the tilting vehicle 10 as a function at least one state variable of the tilting vehicle. The detection system preferentially comprises at least one speed sensor 43 designed to detect information on the instantaneous speed of the tilting vehicle 10 and/or on the acceleration of the tilting vehicle 10. The detection system preferentially comprises at least one inertial platform 44, or IMU (Inertial Measurement Unit) 44, operatively connected to the control unit for processing data of the electronic control system 16.

According to one embodiment, said electronic control system 16 co-operates with the detection system to regulate in an independent way the thrust action exerted by said first extensible assembly 17 and the thrust action exerted by said second extensible assembly 18 of the suspension system 15 on the basis of the information acquired on said one or more state parameters of the tilting vehicle 10, to keep the position of the tilting vehicle 10 stable. In this way, the electronic control system 16 co-operates with the detection system to regulate the thrust action required by the driver 19 by operating the actuation interface 20 in order to keep the position of the tilting vehicle 10 stable. In this way, any loss of balance of the tilting vehicle 10 as a result of the action of command imparted by the driver 19 on the actuation interface 20 of the electronic control system 16 is prevented. According to a preferred embodiment, the electronic control system 16 exerts a feedback-loop control on the information detected by said detection system to keep the position of the tilting vehicle 10 stable.

For example, any inappropriate pressure applied on an actuation interface, for example a pedal, must not lead the tilting vehicle 10 to fall over to one side, and for this purpose the control unit of the electronic control system 16 is configured to interpret the intentions of the driver 19, limiting, if need be, the extent of the thrust action exerted between at least one wheel 11 or 12 and the vehicle frame 14 as a result of the action of command imparted by the driver 19 in order to keep the position of the tilting vehicle 10 stable.

For instance, when the tilting vehicle 10 has to get off the mark from standstill condition and has to turn or steer immediately to the right, the action of command imparted by the driver 19 on the actuation interface 20 markedly controls tilting of the vehicle 10 because the electronic control system 16, by co-operating with the system for detection of at least one state variable of the vehicle, such as the speed of the vehicle, which in this case is substantially zero, enables a thrust action to be exerted, without the vehicle thereby risking falling over to one side.

Thanks to the co-operation between the electronic control system 16 and the detection system, management of the position of the tilting vehicle 10 is enabled with an improved degree of safety, at the same time rendering possible maximum exploitation of the action of command imparted by the driver 19 of the tilting vehicle 10 on said at least one actuation interface 20.

Moreover, the driver 19 is put in a condition to operate safely on the at least one actuation interface 20 in so far as his action of command is filtered, i.e., interpreted by the electronic control system 16, on the basis of the information detected by the detection device designed to detect at least one state variable of the vehicle to keep the position of the tilting vehicle stable, regulating for this purpose the degree of the thrust action between the vehicle frame 14 and the wheels 11, 12.

Figure 6:
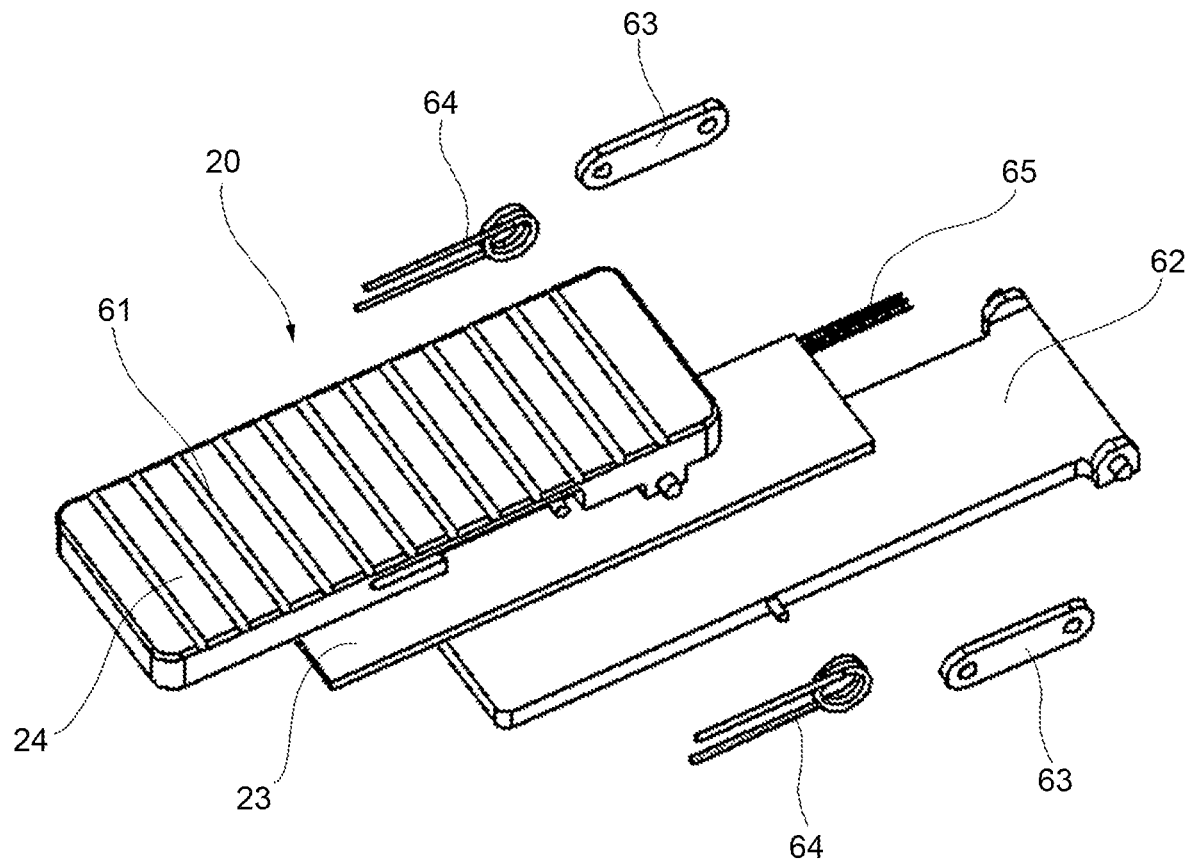
FIG. 6 is an exploded view of the interface of FIG. 5.
Figure 7:
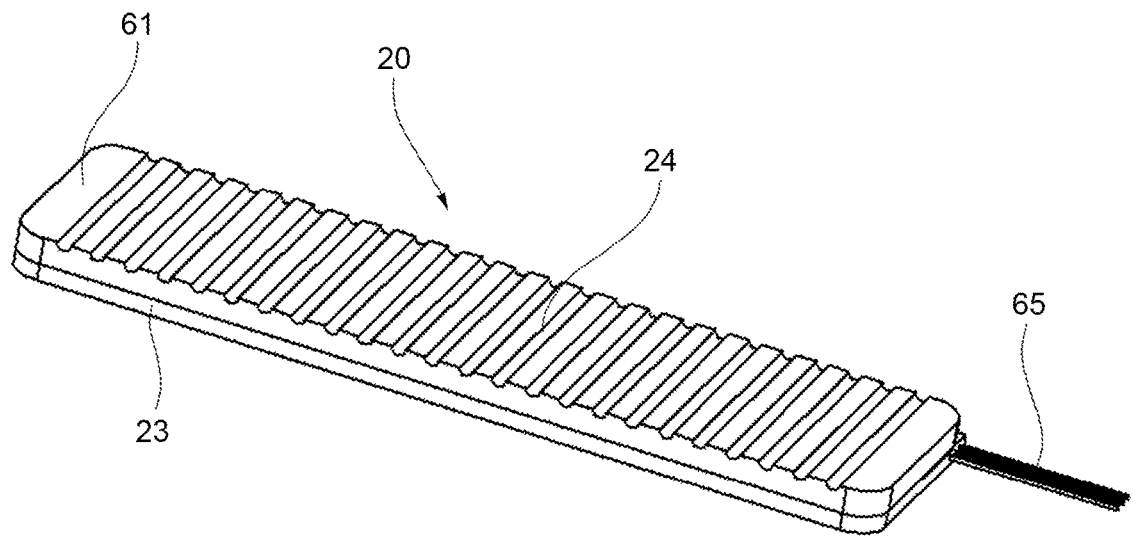
FIG. 7 shows an actuation interface in axonometric view, according to one embodiment.

As illustrated, for example, in FIG. 6, the at least one actuation interface 20 preferentially comprises at least one load cell 23. In this way, the action of command may be imparted by pressing the at least one actuation interface 20, and this pressure is detected by the load cell 23 and transmitted to the electronic control system 16. The action of command imparted by the driver 19 on the at least one command interface 20 may be more or less energetic, and the detection of the degree of the action of command generates a corresponding action of the electric pump 37 so as to control tilting of the tilting vehicle 10 in a way substantially proportional to the degree of the action of command.

Preferentially, the load cell 23 detects a pressure proportional to the degree of the action of command imparted by the driver 19 and transmits a corresponding signal to the electronic control system 16, which processes this information on the degree of action of command and determines execution of a designed thrust action of said first extensible assembly 17 and/or said second extensible assembly 18 of the suspension system 15. In other words, said at least one load cell 23 is configured to detect a pressure proportional to the degree of the action of command imparted by the driver 19 and transmit a signal containing information on the degree of the action of command to the electronic control system 16 so that the electronic control system 16 will process the information on the degree of the action of command to determine execution of a corresponding thrust action by said first extensible assembly 17 and/or said second extensible assembly 18 of the suspension system 15.

The electronic control system 16 can control tilting of the tilting vehicle 10 also automatically on the basis of the information of one or more state parameters acquired by the detection device and, for example, at low travel speeds of the tilting vehicle 10 can automatically block the extensible assemblies 17, 18 so as to keep the position of the tilting vehicle 10 stable.

When, in running conditions, the control system 16 can receive information on the pressure of the working fluid within the tank 40 and transmits actions of command to the pump 37 and/or to the proportional solenoid valve 38, the proportional solenoid valve 38 manages the flow rate of working fluid so as to render the action of the pump 37 effective.

According to a preferred embodiment, said at least one actuation interface 20 is set on the cradle 25 of the tilting vehicle 10 in such a way as to form a footboard that can be reached by at least one foot 39 of the driver 19 of the tilting vehicle 10. In the case where the aforesaid two portions 21, 22 of the actuation interface 20 are provided, a first portion 21 can be reached and operated by a first foot 39 of the driver 19, for example the right foot, and the second portion 22 can be reached and operated by a second foot 39 of the driver 19, for example the left foot.

Preferentially, the at least one exposed surface 24 is set on the dashboard fairing or on the fairing of the vehicle footboard.

The first portion 21 and the second portion 22 of the actuation interface 20 may be separate from one another and not connected and substantially form two islands, each having an exposed actuation surface 24. This makes it possible to set said portions 21, 22 of the actuation interface 20 on opposite sides R, L of the tilting vehicle 10 at a certain distance apart.

According to one embodiment, said first and second portions 21, 22 of said at least one actuation interface 20 are set on two opposite pedals of the tilting vehicle 10. In this way, the driver 19 is put in the condition of being able to exert, by pressing on the first portion 21 and/or on the second portion 22 of the actuation interface 20, preferentially on the pedals 21 and 22, a corresponding thrust on the wheel 11 and 12. Preferentially, the pedal 21 set on the right side R of the tilting vehicle 10, when operated, exerts a thrust on the right wheel 11, and the pedal 22 on the left side L of the tilting vehicle 10, when operated, exerts a thrust on the left wheel 12. In this way, it becomes intuitive for the driver 19 to exert said thrust on the wheels 11 and 12, as if he rested his foot 39 or feet on the ground, obtaining an effect on the position of the tilting vehicle 10 comparable with what would be obtained by resting his foot 39 or feet on the ground, without, however, running the risks that the action of resting his foot or feet on the ground would involve.

According to one embodiment, said first and second portions 21, 22 of said at least one actuation interface 20 are set on opposite sides of the handlebars 46 of the tilting vehicle 10, for example, in the form of control levers and/or push-buttons. In this way, the actuation interface 20 can be set on the handlebars 46 of the tilting vehicle 10 and be designed to be operated by manual command imparted by the driver 19 on its exposed surface 24.

According to one embodiment, said first and second portions 21, 22 of said at least one actuation interface 20 are set on opposite sides of the steering wheel of the tilting vehicle 10, for example, in the form of control levers and/or push-buttons.

According to one embodiment, said actuation interface 20 is set on the seat 42 and/or on the seat support. According to one embodiment, said first and second portions 21, 22 of said at least one actuation interface 20 are set on the seat 42 and/or on the seat support of the tilting vehicle 10.

According to one embodiment, for example when said actuation interface 20 is set on the seat 42 and/or on the seat support, an action of command imparted on the first portion 21 of the actuation interface 20 set on the right side R determines an increase in tilting of the tilting vehicle 10 towards the right side R, and an action of command imparted on the second portion 22 of the actuation interface 20 set on the left side L determines an increase in tilting of the tilting vehicle 10 towards the left side L.

According to one embodiment, said actuation interface 20 comprises a load cell 23, and a covering element 61 for covering the load cell 23, which is equipped with said exposed surface 24. A load cell operative connection 65 is provided between the load cell 23 and the data-processing unit of the control system 16. There may be provided a supporting element 62 that supports the load cell 23 so that the load cell 23 will be located between said covering element 61 and said supporting element 62.

According to one embodiment, illustrated, for example, in FIG. 6, said covering element 61 is articulated, for example hinged directly or indirectly by interposition of at least one connecting rod 63, to said supporting element 62. One or more elastic elements 64 may be provided, which urge the exposed surface 24 away from the load cell 23 by a predefined value. The travel of the actuation interface 20 perceived by the driver 19 can be regulated by acting on the stiffness of the one or more elastic elements 64.

Figure 8:
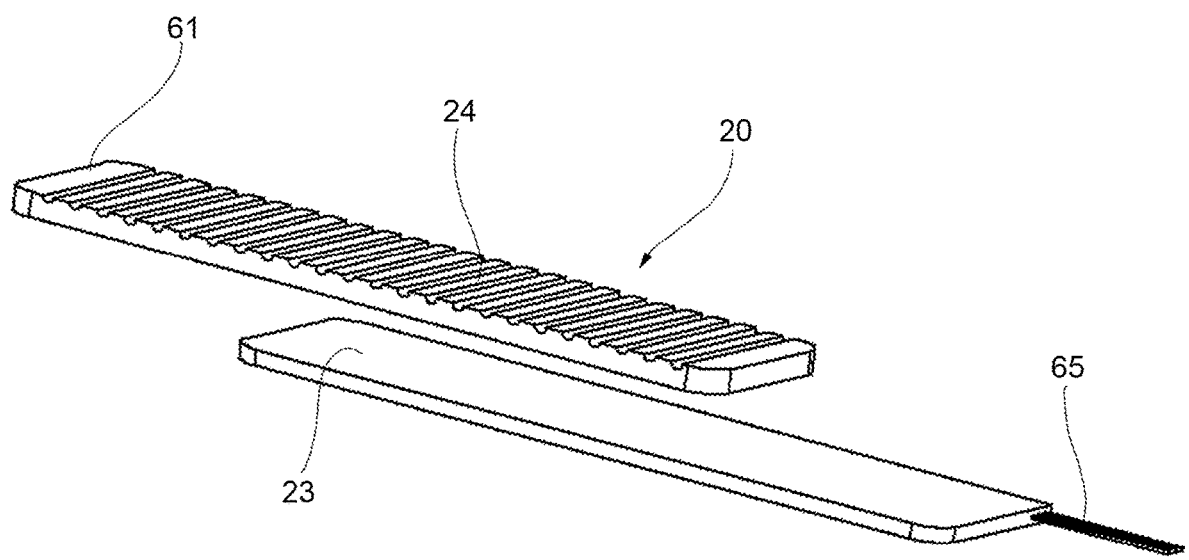
FIG. 8 is an exploded view of the interface of FIG. 7.
Figure 9:
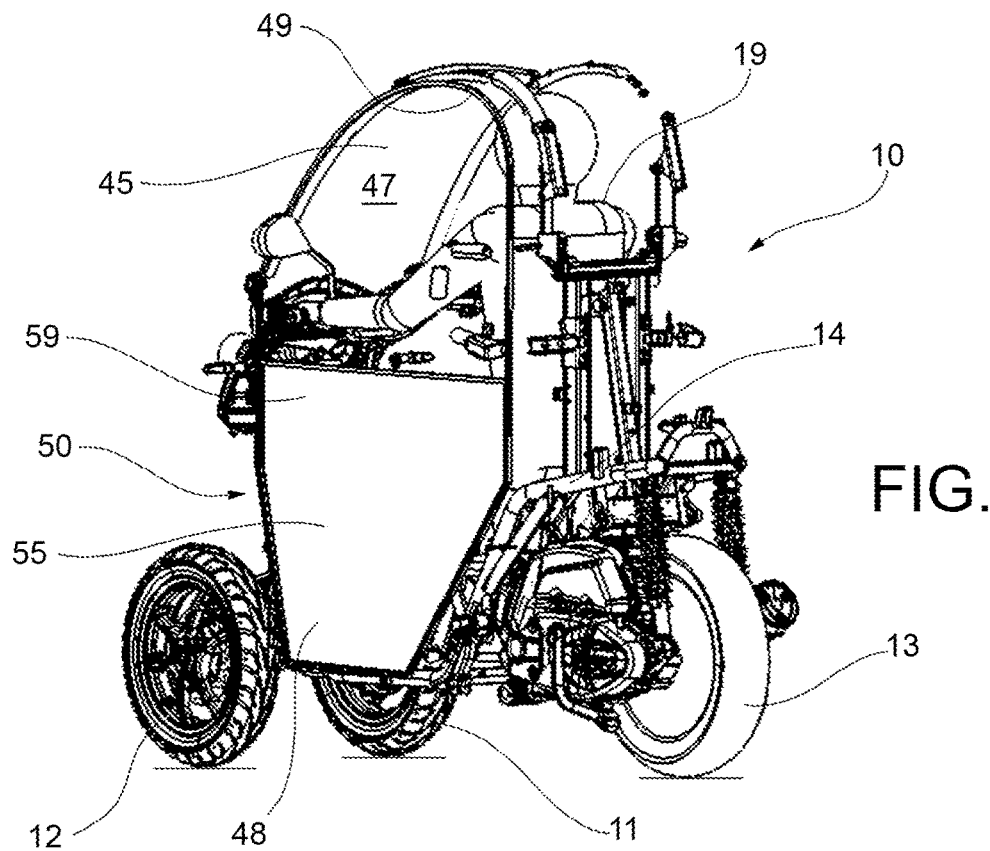
FIG. 9 shows an axonometric view of a tilting vehicle, according to one embodiment.
Figure 10:
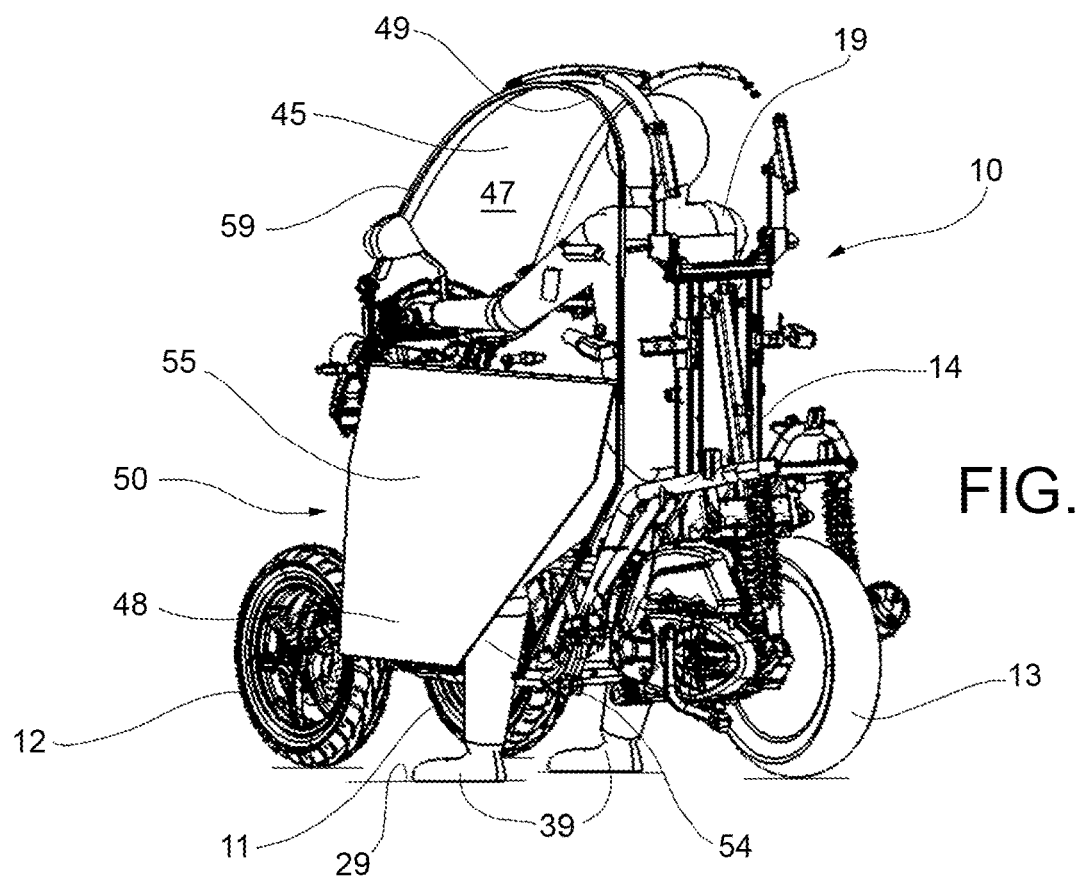
FIG. 10 is an axonometric view of a tilting vehicle comprising a safety device, according to one embodiment.

According to an embodiment illustrated, for example, in FIG. 8, the covering element 61 is associated intimately in contact with the load cell 23; for example, it is fixed on the load cell 23. Preferentially, the covering element 61 is made of elastically deformable material, for example, an elastomer, so as to urge the exposed surface 24 away from the load cell 23. The travel of the actuation interface 20 perceived by the driver 19 can be regulated by acting on the composition and on the elastic response of the material of the covering element 61.

According to one embodiment, the tilting vehicle 10 further comprises a cabin 45 fixedly connected to said vehicle frame 14, which defines a cockpit 47 designed to receive the driver 19 of the tilting vehicle 10. Preferentially, said cockpit 47 comprises at least one hatch 48 that can be opened to allow the driver 19 to gain access to the cockpit 47.

Preferentially, said at least one actuation interface 20 is located within said cockpit 47. In the case where said cockpit 47 is provided, also the steering controller 46 and preferentially at least one seat 42 for the driver 19 are provided within the cockpit 47. When the driver 19 is sitting in the seat 42, he can conveniently reach said at least one actuation interface 20.

According to one embodiment, said exposed surface 24 of the at least one actuation interface 20 is set lower than the seat 42.

According to one embodiment, which may not necessarily be combined with the embodiments described previously, the tilting vehicle 10 comprises safety systems 50 to enable emergency opening of said at least one hatch 48. In this way, the driver 19 is allowed to rest his feet 39 on the ground 29 in the event of malfunctioning of the control system 16 and/or of the actuation interface 20.

According to one embodiment, one of the safety systems 50 comprises one or more actuation cables, for example Bowden cables, operatively connected to at least one on-off valve 51, designed to prevent, selectively, passage of fluid between said first chambers 31 and said ducts 34 of the suspension system 15. For instance, by manual pulling of the Bowden cable the on-off valves 51 close. In this way, passage of working fluid is interrupted, and the tilting vehicle 10 is stabilized; i.e., tilting is blocked, and the driver can avoid having to put his feet on the ground so as not to lose his balance, both in the case of malfunctioning of the electronic control system of the suspension and in the case of a prolonged stop.

According to one embodiment, as illustrated, for example, in FIG. 12, one of the safety systems 50 comprises at least one actuation cable 52 operatively connected to an emergency locking device 53 for locking the at least one hatch 48 of the cabin 45 of the tilting vehicle 10. The at least one actuation cable 52 is preferentially set inside the cockpit 47. In this way, the driver 19, by operating the actuation cable 52, causes emergency opening of the at least one hatch 48. The actuation cable 52 can be set on a bottom portion of the door 59, for example in a position lower than the seat 42 of the tilting vehicle 10, so that it can be operated by means of the action of a leg or foot 39 of the driver 19, as indicated by the arrow of FIG. 12.

As illustrated, for example, in FIG. 14, the at least one hatch 48 is hinged to the frame 49 of the door 59 of the tilting vehicle 10 so that emergency opening of the hatch 48 will bring about formation of a gap or passage 54 in the bottom portion of the hatch 48 in order to allow the driver 19 conveniently to rest at least one foot 39 on the ground 29, thus stabilizing the position of the tilting vehicle 10, i.e., substantially stabilizing tilting thereof as a result of the driver 19 resting at least one foot 39 on the ground 29. According to one embodiment, the locking device 53 of the hatch 48 is designed to keep the hatch 48 stably closed.

The locking action of the locking device 53 can be controlled mechanically, for example by means of said control cable 52, or electrically. In other words, an emergency opening system is provided for opening the at least one mechanically and/or electrically operated locking device 53.

According to one embodiment, the locking device 53 of the hatch 48 comprises a bistable or redundant engagement system.

According to one embodiment, the locking device 53 is kept engaged alternatively in a mechanical way or else in an electrical way, for example by means of an electrical connection with the data-processing unit of the control system 16. In this way, with the vehicle engine off, the hatch 48 is kept closed mechanically. When the vehicle engine is turned on, an electrical force causes locking of the locking device 53. In the event of malfunctioning, the electrical current is interrupted either as a result of command signals of the control system 16 or as a consequence of a failure, thus releasing the setting device 53 so that the hatch 48 is automatically opened.

Emergency opening of the hatch 48 can be favoured by providing at least one elastic device that urges the hatch 48 open, facilitating formation of the gap 54.

According to one embodiment, the hatch 48 comprises a panic handle facing the cockpit 47 so as to enable emergency opening of the hatch 48 and formation of the gap 54.

According to an embodiment as illustrated, for example, in FIG. 15, the hatch 48 comprises, on its outer face 55 facing in a direction opposite to the cockpit 47, a profile having a conformation such as to interact aerodynamically with the current of air 66 during advance of the tilting vehicle 10. The conformation of the profile of the outer face 55 of the hatch 48 can be configured so that it will exert a force of retention 67, aimed at keeping the hatch 48 closed, that increases as the speed of advance of the tilting vehicle 10 increases. In this way, the hatch 48 will oppose a greater resistance to emergency opening at high travel speeds of the vehicle 10 and a slighter resistance at low travel speeds of the vehicle 10.

Described hereinafter is a method for controlling tilting of a tilting vehicle 10.

According to a general operating mode, a method for controlling tilting of a tilting vehicle 10, which has at least one vehicle frame 14 and three vehicle wheels that comprise a right wheel 11 and a left wheel 12 set alongside one another, includes the steps of:

- imparting an action of command on at least one actuation interface 20 operatively connected to an electronic control system 16 of a suspension system 15 that operatively connects said right wheel 11 and said left wheel 12 to said vehicle frame 14; and
- on the basis of the action of command imparted, determining a thrust action between said vehicle frame 14 and said right wheel 11 and/or said left wheel 12 to control tilting of the tilting vehicle 10.

According to a possible operating mode, the method comprises the further step of acquiring information on one or more state parameters of the tilting vehicle 10 and regulating accordingly the degree of thrust action between said vehicle frame 14 and said right wheel 11, and/or said left wheel 12, to keep the position of the tilting vehicle 10 stable.

According to a possible operating mode, the method comprises the further step of exerting the thrust and causing possible lengthening and/or shortening of each of said first and second extensible assemblies 17, 18 of the suspension system 15 in an independent way to control tilting of the tilting vehicle 10.

According to a preferred operating mode, the step of imparting said action of command on said at least one actuation interface 20 is executed by at least one foot 39 of a driver 19 of the tilting vehicle 10.

According to a possible operating mode, the step of imparting said action of command is executed by at least one hand of the driver 19 of the tilting vehicle 10.

According to a possible operating mode, tilting of the tilting vehicle 10 is controlled automatically by the electronic control system 16 when the tilting vehicle is standing still or proceeds, for example, at low travel speeds.

According to a possible operating mode, tilting of the tilting vehicle 10 is controlled manually by the driver 19 by means of actuation of the actuation interface 20 in all conditions of use.

According to a possible operating mode, tilting of the tilting vehicle 10 is controlled by the thrust action exerted by resting at least one foot of the driver 19 on the ground, for example in emergency conditions.

According to a possible operating mode, in which the tilting vehicle 10 is a closed vehicle having a cabin 45 that defines a cockpit 47, a mechanically operated and/or electrically operated emergency hatch 48 is provided, according to any one of the embodiments described previously. Preferentially, the emergency hatch 48 can be opened when the vehicle proceeds at low travel speeds. Preferentially, the emergency hatch 48 can be opened by means of an action of thrust, for example a lateral thrust, exerted by a leg or foot of the driver.

According to a preferred operating mode, the method is implemented by a tilting vehicle 10 according to any one of the embodiments described above.

Thanks to the characteristics described above provided separately from one another or jointly together in particular embodiments, it is possible to obtain a vehicle, as well as a method, that at the same time will meet the conflicting needs described above and the aforementioned desired advantages. In particular:

- the invention makes it possible, in an intuitive way, to control tilting, and hence the angle of roll, of the tilting vehicle upon command both in conditions where the vehicle is standing still and in conditions when the vehicle is travelling forwards;
- the invention affords an improved driving safety and an improved comfort for the driver, as well as a greater freedom of driving for the driver, in particular when he is taking a bend;
- the control system can filter the action of command imparted by the driver, preventing unbalancing of the tilting vehicle;
- a semi-automatic system for control of the position of the tilting vehicle is provided;
- the invention affords improved safety for the driver by providing safety systems that function even in the event of malfunctioning of the control system; and
- an emergency system is provided that can be operated by the driver in an intuitive way.

Numerous modifications, adaptations, and replacements of elements with other functionally equivalent ones may be made to the embodiments described above by a person skilled in the branch in order to meet contingent and specific needs, without thereby departing from the scope of the ensuing claims.

The invention claimed is:

1. A tilting vehicle comprising:
   a vehicle frame;
   at least three vehicle wheels including at least one right wheel and at least one left wheel set alongside one another;
   an electronically controlled suspension system operatively connecting said at least one right wheel and said at least one left wheel to said vehicle frame; and
   an electronic control system operatively connected to said suspension system,
   wherein:
   said suspension system comprises a first extensible assembly between said at least one right wheel and said vehicle frame, said first extensible assembly being configured to exert a first thrust action between said at least one right wheel and said vehicle frame to control tilting of the tilting vehicle;
   said suspension system comprises a second extensible assembly between said at least one left wheel and said vehicle frame, said second extensible assembly being configured to exert a second thrust action between said at least one left wheel and said vehicle frame to control tilting of the tilting vehicle;
   wherein the electronic control system is configured to command a change in a length of the first and second extensible assemblies to deliver at least one of the first and second thrust actions to control the tilting of the tilting vehicle;

the tilting vehicle comprises at least one actuation interface comprising at least one exposed surface operatively connected to the electronic control system, wherein said at least one actuation interface comprises at least one load cell; and said at least one actuation interface is configured to be operated when needed by a driver of the tilting vehicle in order to control the tilting of the tilting vehicle upon command, including where the at least one actuation interface is configured to receive a command action imparted thereon by the driver;

said at least one load cell is configured to detect a pressure proportional to the extent of the command action configured to be imparted by the driver and is configured to transmit a signal containing information on the extent of the command action to the electronic control system so that the electronic control system processes information on the extent of the command action in order to determine and command a delivery of the first and/or second thrust actions by controlling the change in length of said first and/or second extensible assemblies of the suspension system.

2. The tilting vehicle according to claim 1, wherein said at least one actuation interface comprises at least one first portion and one second portion arranged opposite with respect to a median axis of the tilting vehicle so that the driver of the tilting vehicle is put in a condition to be configured to exert, by pressing on the first portion and/or the second portion of the at least one actuation interface, the thrust action between said vehicle frame and said at least one right wheel and/or said at least one left wheel, respectively.

3. The tilting vehicle according to claim 1, comprising a seat, wherein said exposed surface of the at least one actuation interface is located lower than the seat.

4. The tilting vehicle according to claim 1, wherein said at least one actuation interface is set on a cradle of the tilting vehicle to form at least one footboard that is configured to be reached by at least one foot of the driver of the tilting vehicle.

5. The tilting vehicle according to claim 2, wherein said first and second portions of said at least one actuation interface are set on two opposite pedals of the tilting vehicle.

6. The tilting vehicle according to claim 2, wherein said first and second portions of said at least one actuation interface are set on opposite sides of a handlebar of the tilting vehicle.

7. The tilting vehicle according to claim 1, wherein each one of said first and second extensible assemblies of the suspension system is a hydro-pneumatic shock absorber and comprises a cylinder that slidably receives a piston, thereby forming a first chamber;
wherein:
the first chamber of the first extensible assembly is in fluid communication with the first chamber of the second extensible assembly by means of a duct; and/or
the suspension system further comprises a pump and a proportional solenoid valve, which are operatively connected to the electronic control system; and/or
the electronic control system is associated to a detection system suitable for detecting information on at least one state variable of the tilting vehicle, including a speed of advance of the tilting vehicle and/or an angle of inclination of roll of the tilting vehicle and/or a pressure in a tank of the suspension system of the tilting vehicle.

8. The tilting vehicle according to claim 1, further comprising a cabin fixedly connected to said vehicle frame that defines a cockpit designed to receive the driver of the tilting vehicle,
and wherein:
said cockpit comprises at least one door that is configured to be opened to allow the driver to enter the cockpit; and
said at least one actuation interface is located inside said cockpit.

9. The tilting vehicle according to claim 8, comprising at least one safety system to enable opening of an emergency hatch of said at least one door; wherein:
said emergency hatch is hinged to a frame of the at least one door of the tilting vehicle so that emergency opening of the emergency hatch will bring about formation of a gap in a bottom portion of the emergency hatch that is configured to allow the driver to rest at least one foot on the ground.

10. The tilting vehicle according to claim 9, wherein said at least one safety system comprises:
at least one locking device designed to keep the at least one emergency hatch closed; and
a system for emergency opening of the at least one locking device;
and/or wherein:
said system for emergency opening of the at least one locking device comprises at least one of the following:
an actuation cable operatively connected to the at least one emergency locking device for locking the at least one hatch; said actuation cable is set inside the cockpit of the tilting vehicle; and
an electrically powered device that keeps the at least one locking device locked and, in an event of malfunctioning, electric power supply is interrupted either as a result of command signals of the control system or as a consequence of a failure, thus opening the at least one locking device to enable automatic opening of the emergency hatch.

11. A method for controlling tilting of a tilting vehicle having at least one vehicle frame and three vehicle wheels that comprise a right wheel and a left wheel set alongside one another, including the following steps:
imparting an action of command on at least one actuation interface operatively connected to an electronic control system of a suspension system that operatively connects said right wheel and said left wheel to said at least one vehicle frame;
determining, on a basis of the action of command imparted, a thrust action between said at least one vehicle frame and said right wheel and/or said left wheel to control tilting of the tilting vehicle; and
commanding said suspension system to exert said thrust action by commanding a change in length of the suspension system to control the tilting of the tilting vehicle.

12. The method according to claim 11, wherein the step of imparting said action of command is configured to be performed by at least one foot of a driver of the tilting vehicle.

13. The method according to claim 11, wherein a control unit of the electronic control system is configured to interpret intentions of the driver to limit an extent of the thrust action exerted between the right wheel and/or said left wheel and the at least one vehicle frame as a result of the action of command configured to be imparted by the driver.

14. The method according to claim 11, wherein the electronic control system is further configured to control tilting of the tilting vehicle automatically on a basis of information of one or more state parameters acquired by a detection device, whereby at low travel speeds of the tilting vehicle, the electronic control system is configured to automatically block extensible assemblies of the suspension system.

\* \* \* \* \*